(12) United States Patent
Iemura (10) Patent No.: US 8,093,887 B2
(45) Date of Patent: Jan. 10, 2012

(54) MOUNTING STRUCTURE FOR WHEEL ROTATION SENSOR

(75) Inventor: Hideaki Iemura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 260 days.

(21) Appl. No.: 12/514,191

(22) PCT Filed: Nov. 12, 2007

(86) PCT No.: PCT/JP2007/071899
§ 371 (c)(1),
(2), (4) Date: May 8, 2009

(87) PCT Pub. No.: WO2008/059786
PCT Pub. Date: May 22, 2008

(65) Prior Publication Data
US 2010/0038504 A1 Feb. 18, 2010

(30) Foreign Application Priority Data
Nov. 17, 2006 (JP) .................................. 2006-312085

(51) Int. Cl.
*G01B 7/30* (2006.01)
(52) U.S. Cl. ................................. 324/207.25
(58) Field of Classification Search .................. None
See application file for complete search history.

(56) References Cited

U.S. PATENT DOCUMENTS

| 3,626,226 A | * | 12/1971 | Pauwels et al. | 310/168 |
| 3,719,841 A | * | 3/1973 | Ritsema | 310/155 |
| 3,760,210 A | * | 9/1973 | Abate | 310/168 |
| 4,698,536 A | * | 10/1987 | Oohori | 310/168 |
| 5,223,760 A | * | 6/1993 | Peck et al. | 310/168 |
| 6,492,805 B1 | | 12/2002 | Wakabayashi et al. | |

FOREIGN PATENT DOCUMENTS

| JP | 02-218918 A | 8/1990 |
| JP | 03-85258 U | 8/1991 |
| JP | 04-368266 A | 12/1992 |
| JP | 07-205779 A | 8/1995 |
| JP | 2001-165949 A | 6/2001 |

* cited by examiner

Primary Examiner — Paresh Patel
(74) Attorney, Agent, or Firm — Sughrue Mion, PLLC (57) ABSTRACT

A mounting structure for wheel rotation sensor 40 includes a brake flange 20, a bracket 30, and a wheel rotation sensor 40. The brake flange 20 is disposed near a sensor rotor 10 fixed to an axle of a wheel, includes a flange surface 21 intersecting the axle, and is fixed to a vehicle body side. Moreover, boss portions 26 protrude integrally from the flange surface 21 of the brake flange 20. The bracket 30 is fixed to the brake flange 20 while contacting distal portions 27 of the boss portions 26. The wheel rotation sensor 40 is fixed to the bracket 30, faces a rotation trajectory of the sensor rotor 10, and detects the sensor rotor 10 in a direction substantially parallel to the axle.

2 Claims, 6 Drawing Sheets

MOUNTING STRUCTURE FOR WHEEL ROTATION SENSOR

TECHNICAL FIELD

The present invention relates to a mounting structure for wheel rotation sensor for a vehicle.

BACKGROUND ART

Information on the rotational speed of the wheel is sometimes used in the control of a vehicle such as the anti-lock brake system (ABS). A wheel rotation sensor for detecting the rotational speed of the wheel is fixed, inside a disc wheel, to a vehicle body side so as to face a sensor rotor fixed to an axle of the wheel.

Japanese Patent Application Publication No. Hei 4-368266 discloses, as a mounting structure for the wheel rotation sensor, one in which the wheel rotation sensor is mounted to a support bracket for mounting brake parts, and a bracket for housing wires of the wheel rotation sensor is provided in a manner of striding over a rotor disc.

Patent Document 1: Japanese Patent Application Publication No. Hei 4-368266

DISCLOSURE OF THE INVENTION

Problems to be Solved by the Invention

Meanwhile, in order to accurately detect the rotation of the sensor rotor with the wheel rotation sensor, it is desirable that the wheel rotation sensor is mounted with highly precise positioning with respect to the sensor rotor. Specifically, it is desirable that the wheel rotation sensor is positioned to face the sensor rotor as closely as possible thereto.

Moreover, a structure that saves space is desirable because the space inside the disc wheel where the wheel rotation sensor is mounted is limited.

However, in the above-described conventional structure, since the bracket striding over the rotor disc is provided, the space inside the disc wheel needs to be formed wide, which may result in an increase in the size of the disc wheel.

The present invention has been made in view of the above-described circumstances, and an object thereof is to provide a mounting structure for wheel rotation sensor that enables positioning work for the wheel rotation sensor with respect to the sensor rotor to be performed easily with high precision, and further, that is capable of reducing in size.

Means for Solving the Problems

To achieve the object, a mounting structure for wheel rotation sensor according to the present invention includes a brake flange, a bracket, and a wheel rotation sensor.

The brake flange is disposed near a sensor rotor fixed to an axle of a wheel, includes a flange surface intersecting the axle, and is fixed to a vehicle body side. Moreover, a boss portion protrudes integrally from the flange surface of the brake flange. The bracket is fixed to the brake flange while contacting a distal portion of the boss portion. The wheel rotation sensor is fixed to the bracket, faces a rotation trajectory of the sensor rotor, and detects the sensor rotor in a direction substantially parallel to the axle.

In the above-described conFIG.uration, the bracket with the wheel rotation sensor fixed thereto is fixed while contacting the distal end of the boss portion protruding from the flange surface of the brake flange. Accordingly, cutting down the distal end of the boss portion changes, in the axle direction, the position at which the bracket with the wheel rotation sensor fixed thereto is attached. Accordingly, adjusting the cutting amount of the boss portion makes it possible to precisely set the wheel rotation sensor at a desired position. Further, setting large a protrusion height of the boss portion in advance makes it possible to increase a possible range of the mounting position of the wheel rotation sensor.

In addition, since the wheel rotation sensor is disposed at such a position as to detect the sensor rotor 10 in the direction substantially parallel to the axle, the positioning work can be easily performed compared with a case where the wheel rotation sensor detects the sensor rotor in a direction obliquely intersecting the axle.

In addition, the brake flange is generally formed by casting because it has a complex three-dimensional shape. Accordingly, the flange surface and the boss portion can be integrally formed in the casting process, and thus an increase in manufacturing steps can be suppressed. Note that, manufacturing errors are likely to occur in cast products; however, it is very unlikely that errors attributable to the casting influence the precision in the mounting of the wheel rotation sensor because the precision in the mounting of the wheel rotation sensor is secured by the cutting down of the boss portion.

In addition, disposing the wheel rotation sensor at a position near the axle enables the diameter of the sensor rotor to be reduced corresponding to the position of the wheel rotation sensor. This makes it possible to reduce the size of the sensor rotor, and hence to achieve a compact whole structure.

In addition, the brake flange may include: a first side surface facing the sensor rotor; a second side surface on a side opposite to the first side surface, the second side surface serving as the flange surface; and a sensor insertion portion penetrating from the first side surface to the second side surface. The boss portion may protrude from the second side surface in a direction away from the sensor rotor. The wheel rotation sensor may be fixed to the brake flange with the bracket therebetween while being inserted into the sensor insertion portion.

In the above-described conFIG.uration, the flange surface is provided on the side, opposite to the surface facing the sensor rotor, of the brake flange, and the boss portion protrudes from the flange surface in the direction away from the sensor rotor, and the brake flange includes the sensor insertion portion into which the wheel rotation sensor is inserted from the flange surface to the sensor rotor side. Accordingly, even if the brake flange has to be disposed near the sensor rotor, the protruding boss portion can be provided. Therefore, it is possible to arrange the first side surface facing the sensor rotor near the sensor rotor, and hence to achieve a compact whole structure. In addition, the sensor rotor is not disposed on the flange surface side where the wheel rotation sensor is to be positioned and mounted. For this reason, since this positioning and mounting work can be performed in a free space, the work ability is improved.

Effects of the Invention

According to the present invention, the positioning work for the wheel rotation sensor with respect to the sensor rotor can be performed easily with high precision, and further, a compact whole structure can be achieved.

DESCRIPTION OF REFERENCE NUMERALS 10 sensor rotor
20, 50 brake flange
21 flange surface
26, 56 boss portion
27, 57 distal portion
30, 60 bracket
40 wheel rotation sensor
51 flange surface (second side surface)
55 hole portion (sensor insertion portion)

BEST MODES FOR CARRYING OUT THE INVENTION

Hereinafter, a first embodiment of the present invention will be described with reference to the drawings.

Figure 1:
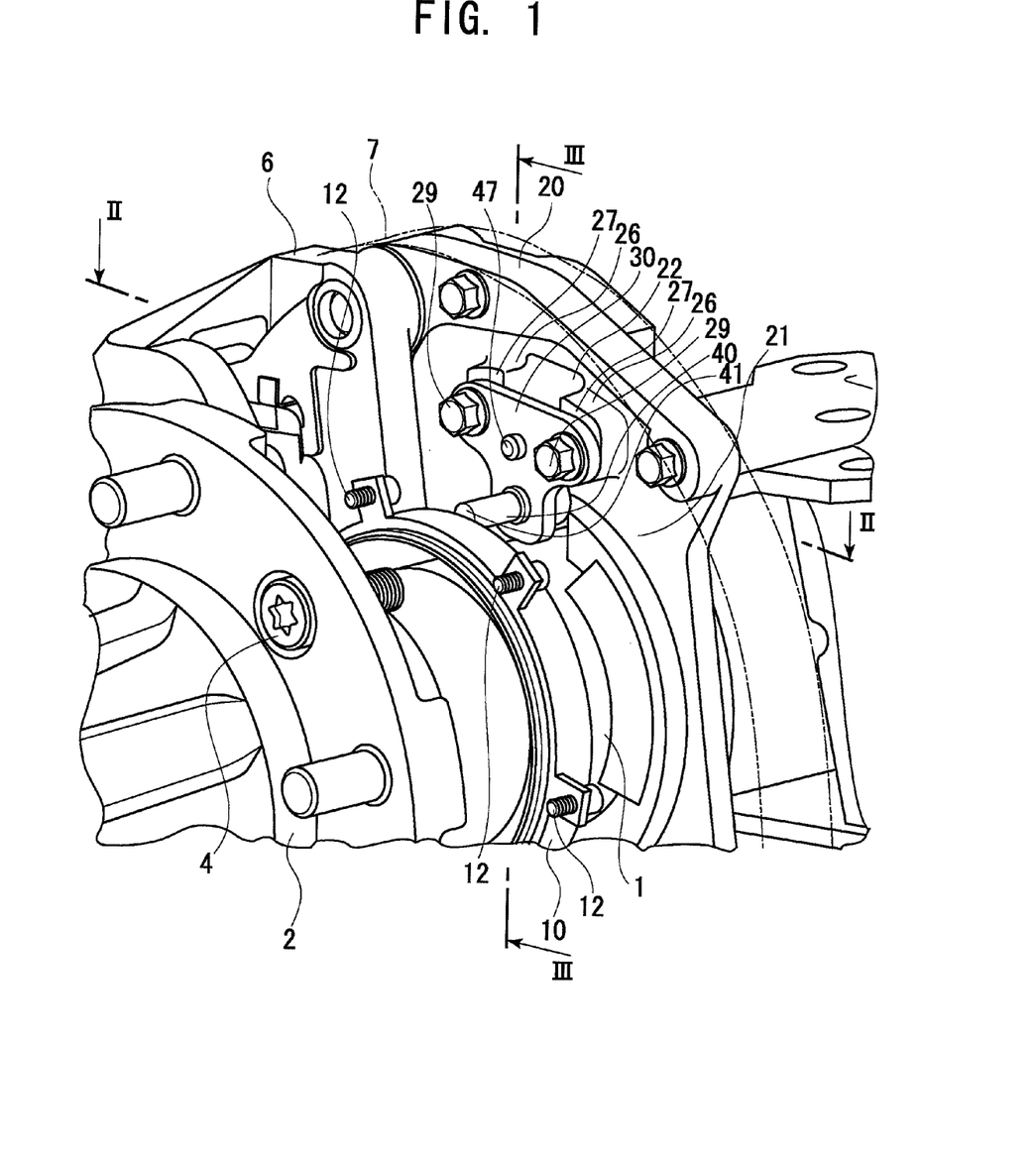
FIG. 1 is a perspective view of a mounting structure for wheel rotation sensor according to a first embodiment.
Figure 2:
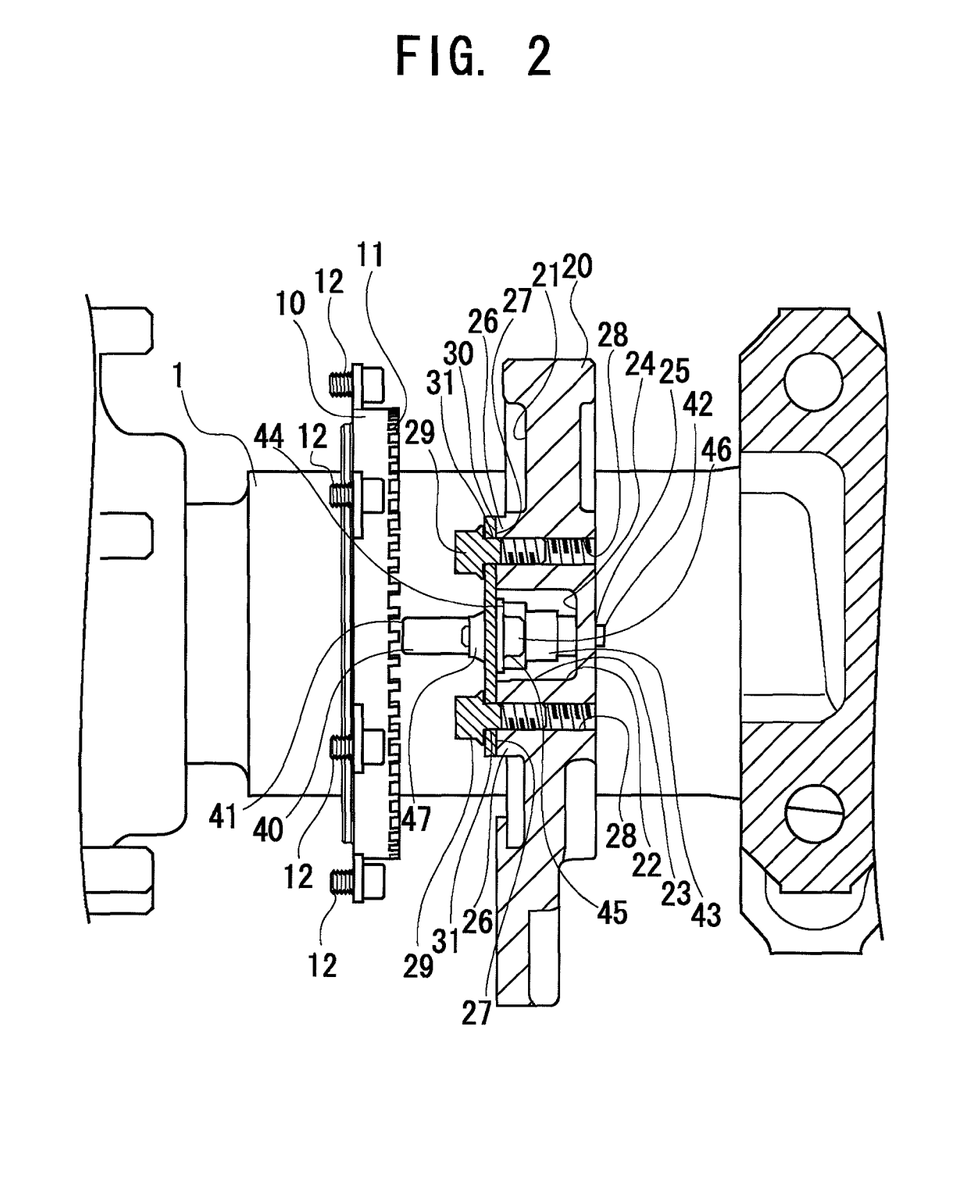
FIG. 2 is a sectional view taken in a horizontal direction (along the II-II line) in FIG. 1.
Figure 3:
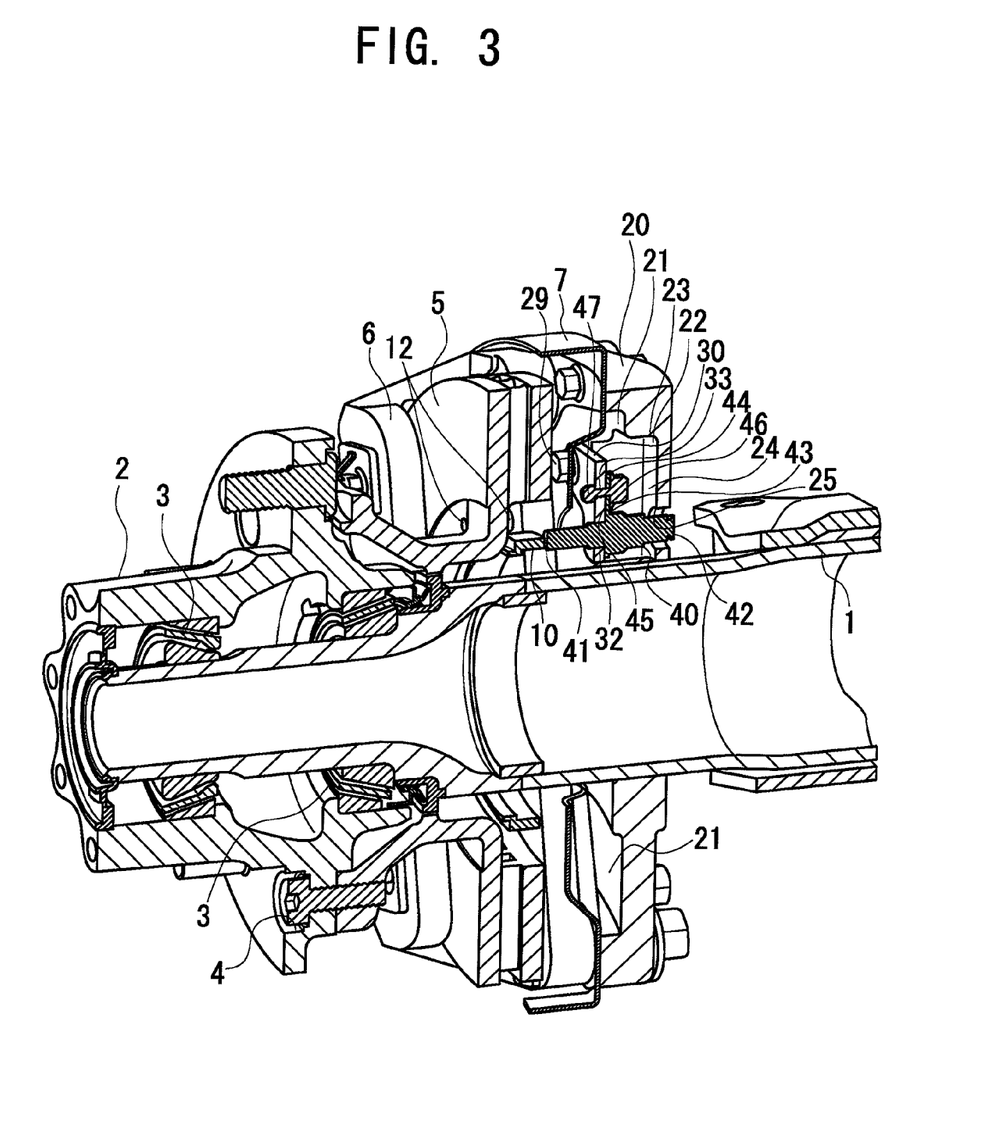
FIG. 3 is a sectional view taken in a vertical direction (along the III-III line) in FIG. 1.
Figure 4:
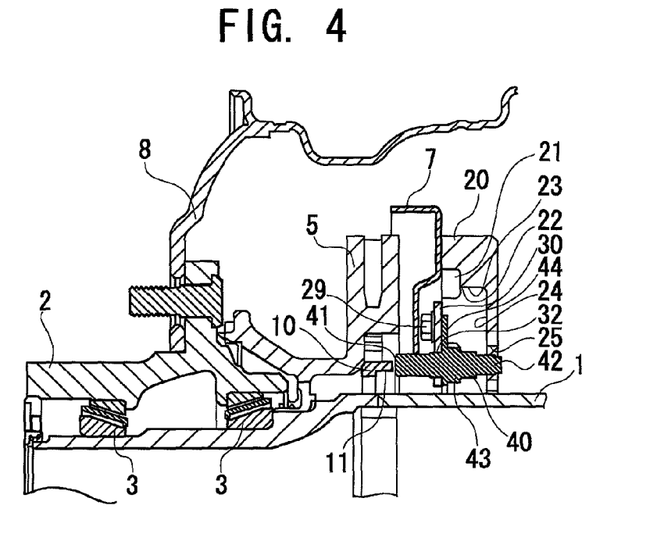
FIG. 4 is a plan view illustrating a cut section of FIG. 3.

FIG. 1 is a perspective view of a mounting structure for wheel rotation sensor according to the first embodiment. FIG. 2 is a sectional view taken in a horizontal direction (along the line II-II) in FIG. 1. FIG. 3 is a sectional view taken in a vertical direction (along the line III-III) in FIG. 1. FIG. 4 is a plan view illustrating a cut section of FIG. 3. Note that a disc pad is not illustrated in FIGS. 1 and 2, and that a dust cover is not illustrated in FIG. 2.

In this embodiment, as illustrated in FIGS. 1 to 4, in order to acquire information on the rotational speed of a wheel used for ABS control of a vehicle, the rotation of a sensor rotor 10 fixed on an axle of the wheel with a hub 2 is detected by a wheel rotation sensor 40 fixed to the vehicle body side. The wheel rotation sensor 40 is fixed to an axle case 1 on the vehicle body side with a brake flange 20 and a bracket 30 therebetween. Note that this embodiment shows an example where the wheel rotation sensor 40 is disposed inside a disc wheel 8 (illustrated in FIG. 4) of a rear wheel on the right side of the vehicle body. However, the wheel rotation sensor 40 may be disposed at a position that allows the detection of the rotation of another wheel. In addition, information on the rotational speed of the wheel may be used not only in the ABS control for the vehicle but also in other controls for the vehicle.

An axle case 1 (a rear axle case in this embodiment) is provided at the rear of a lower frame of the vehicle. The axle case 1 houses the axle that transmits the rotation to the right and left disc wheels 8 from a differential gear housed at the center, and supports the vehicle weight. Note that the illustrations of the wheel, the axle inside the axle case 1 and the like are omitted.

The hub 2 is rotatably attached to the axle case 1 with a rotating portion 3 having bearings therebetween and is fixed to the axle of the wheel.

The sensor rotor 10 is fixed with bolts 12 to an inner peripheral side of a brake rotor 5 fixed to the axle of the wheel by being fixed to the hub 2 with bolts 4. A detected portion 11 is provided to the inner side, in the vehicle width direction, of the annular rotor concentric with the axle. The detected portion 11 has concavities and convexities sequentially formed thereon at fixed intervals.

The brake flange 20 is disposed near the sensor rotor 10, includes a flange surface 21 intersecting substantially orthogonal to the axle, and is welded to the axle case 1 with the flange surface 21 facing outward in the vehicle width direction (facing the sensor rotor 10). In the brake flange 20, a housing 22 and boss portions 26 are integrally formed on the flange surface 21 by casting. Fixed to the brake flange 20 are a disc pad 6 that brakes the brake rotor 5, a dust cover 7 that protects the brake rotor 5 and other components from dust and the like, and the bracket 30 with the later-described wheel rotation sensor 40 fixed thereto.

The housing 22 includes a wall portion 23, a bottom portion 24, and a hole portion 25 formed in a part of the bottom portion 24.

Two boss portions 26 are disposed sandwiching the housing 22, and each include: a distal portion 27 protruding in the axle direction from the flange surface 21 and having a surface substantially orthogonal to the axle; and a nut portion 28 into which a bolt 29 is screwed in a direction substantially parallel to the axle from the distal portion 27 toward a surface, opposite to the flange surface 21, of the brake flange 20.

The bracket 30 is a metal plate press-formed in a substantially T-shape. In each of both ends of parts, extending laterally, of the bracket 30, an insertion hole 31 positioned to face the nut portion 28 of the corresponding boss portion 26 is formed. In an end of a part, extending vertically, of the bracket 30, a sensor insertion hole 32 is formed. Near the sensor insertion hole 32, a fixing hole 33 is formed. The bracket 30 is fixed to the brake flange 20 while contacting the distal portions 27 of the boss portions 26 in a way that the bolts 29 inserted into the insertion holes 31 are screwed respectively into the nut portions 28.

The wheel rotation sensor 40 is formed of: a rod-like device portion 43 having a detecting portion 41 at one end thereof and an output portion 42 at the other end thereof; and a fixing piece 44 extending from the middle of the device portion 43. The detecting portion 41 is an optical sensor for measuring a relative distance and detects a distance to the detected portion 11 of the sensor rotor 10. The output portion 42 outputs differences in distance to the concave-convex portion of the detected portion 11, which is read by the detecting portion 41, to a controller (not illustrated) through a connecting wire (not illustrated) as a pulse wave. The fixing piece 44 includes a mounting hole 45 positioned to face the fixing hole 33 of the bracket 30. The wheel rotation sensor 40 is fixed in a manner that the mounting hole 45 and the fixing hole 33 of the bracket 30 are fixed to each other with a bolt 46 and a nut 47, with the detecting portion 43 being inserted, from its detecting portion 41 side, into the sensor insertion hole 32 of the bracket 30. The wheel rotation sensor 40 is fixed to the brake flange 20 with the bracket 30 therebetween with the detecting portion 41 facing a rotation trajectory of the detected portion 11 of the sensor rotor 10 in the direction substantially parallel to the axle.

The controller receives through the connecting wire the pulse signal outputted by the output portion 42. The controller performs the ABS control for limiting the braking of the disc pad 6 on the brake rotor 5 on the basis of the rotational speed obtained from the received pulse signal, a stepping speed of a brake pedal (not illustrated), and the like.

The wheel rotation sensor 40 of this embodiment is mounted to the brake flange 20 welded to the axle case 1. First, the wheel rotation sensor 40 is inserted into the sensor insertion hole 32 of the bracket 30 from the detecting portion 41 side of the device portion 43, and then, the mounting hole 45 of the fixing piece 44 and the fixing hole 33 of the bracket 30 are fixed to each other with the bolt 46 and the nut 47. Next, the bracket 30 with the wheel rotation sensor 40 fixed thereto is fixed to the brake flange 20 in a way that the bolts 29 are inserted into the insertion holes 31 of the bracket 30 and screwed into the nut portions 28 of the boss portions 26 of the brake flange 20.

In this embodiment, the wheel rotation sensor 40 is positioned and mounted differently for each vehicle. Specifically, the wheel rotation sensor 40 fixed to the bracket 30 is mounted while being positioned in a way that the detecting portion 41 of the wheel rotation sensor 40 is caused to face the rotation trajectory of the detected portion 11 of the sensor rotor 10 in the direction substantially parallel to the axle as closely as possible thereto.

Here, since the bracket 30 with the wheel rotation sensor 40 fixed thereto is fixed to the brake flange 20 while contacting the distal portions 27 of the boss portions 26, the position (distance, angle) at which the wheel rotation sensor 40 is mounted changes if the positions of the distal portions 27 change. Moreover, the height of each of the protruding boss portions 26 is slightly higher than the height needed for fixing, at a desired position, the bracket 30 with the wheel rotation sensor 40 fixed thereto. Further, each of the distal portions 27 of the boss portions 26 has an area that is small relative to the bracket 30, and can be cut down using a file or the like relatively easily. Thus, if the distance from the detecting portion 41 of the wheel rotation sensor 40 to the detected portion 11 of the sensor rotor 10 is too close when the wheel rotation sensor 40 fixed to the bracket 30 is to be mounted to the brake flange 20, cutting down the distal portions 27 of the boss portions 26 makes it possible to change, in the axle direction, the distal portions 27 orthogonal to the axle, and to precisely set the mounting position to the desired position.

In addition, in this embodiment, the bracket 30 and the wheel rotation sensor 40 do not contact the bottom portion 24 of the housing 22 of the brake flange 20 in the case where the wheel rotation sensor 40 is mounted with the boss portions 26 not being cut down. Further, the bracket 30 and the wheel rotation sensor 40 do not contact the bottom portion 24 of the housing 22 of the brake flange 20 in the case where the wheel rotation sensor 40 is mounted to the boss portions 26 until the boss portions 26 are cut down to each have a predetermined protrusion distance from the flange surface 21. Accordingly, in this embodiment, it is possible to change the position at which the wheel rotation sensor 40 is mounted by cutting down each of the distal portions 27 of the boss portions 26 within a range of the predetermined distance.

In addition, it is possible to increase a possible range of the position at which the wheel rotation sensor 40 is mounted by setting higher the protrusion height of each boss portion 26.

In addition, the position of the distal portion 27 of each boss portion 26 relative to the sensor rotor 10 is variable depending on an error in shape caused by the casting of brake flange 20, an error in assembly caused by the welding of the brake flange 20 to the axle case 1, and the like. However, since the protrusion distance of each boss portion 26 is set to be slightly larger than the distance needed for fixing the wheel rotation sensor 40 at the desired position, the precision in the mounting of the wheel rotation sensor 40 is secured by cutting down the distal portions 27 even if such errors occur. Therefore, it is very unlikely that such errors influence the precision in the mounting of the wheel rotation sensor 40. Meanwhile, if the wheel rotation sensor 40 is allowed to be mounted at the desired position without cutting down the boss portions 26 by the influence of such errors, it is natural to mount the wheel rotation sensor 40 without cutting down the boss portions 26.

In addition, the wheel rotation sensor 40 is disposed at such a position as to detect the sensor rotor 10 in the direction substantially parallel to the axle. Accordingly, the positioning work can be easily performed compared with a conFIG.uration where the wheel rotation sensor 40 detects the sensor rotor 10 in a direction obliquely intersecting the axle. Specifically, conventionally, there is a conFIG.uration in which the wheel rotation sensor 40 is mounted at such a position as to detect the sensor rotor 10 in a direction obliquely intersecting the axle. In this mounting structure, if the portion to which the wheel rotation sensor 40 is mounted is cut down, the mounting position of the wheel rotation sensor 40 moves also in a direction orthogonal to the axle, which makes the positioning work difficult. However, in this embodiment, the wheel rotation sensor 40 detects the sensor rotor 10 in the direction substantially parallel to the axle. Therefore, the positioning work can be easily performed because it is possible to change only the distance in the axis direction without changing the detecting direction of the wheel rotation sensor 40 by cutting down the distal portions 27 of the boss portions 26.

In addition, an increase in the number of manufacturing steps can be suppressed because the flange surface 21, the housing 22, and the boss portions 26 can be integrally formed in the casting of the brake flange 20.

In addition, disposing the wheel rotation sensor 40 at a position near the axle enables the diameter of the sensor rotor 10 to be reduced corresponding to the position of the wheel rotation sensor 40. This makes it possible to reduce the size of the sensor rotor 10, and hence to achieve a compact whole structure.

Figure 5:
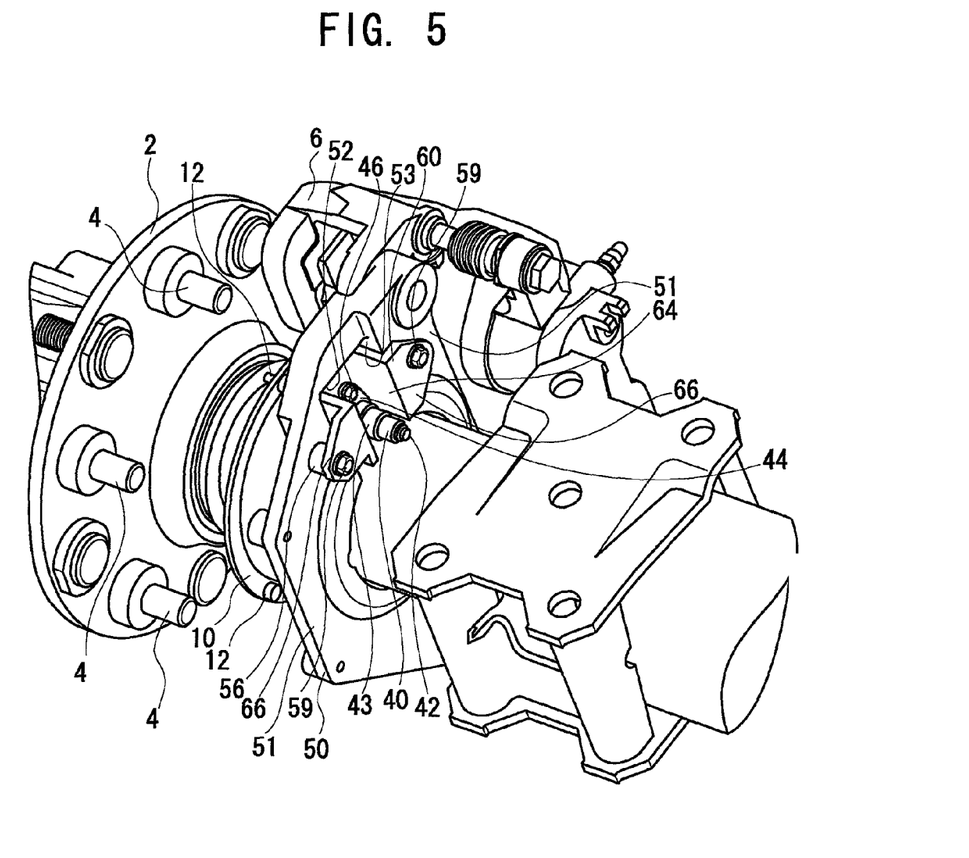
FIG. 5 is a perspective view of a mounting structure for wheel rotation sensor according to a second embodiment.
Figure 6:
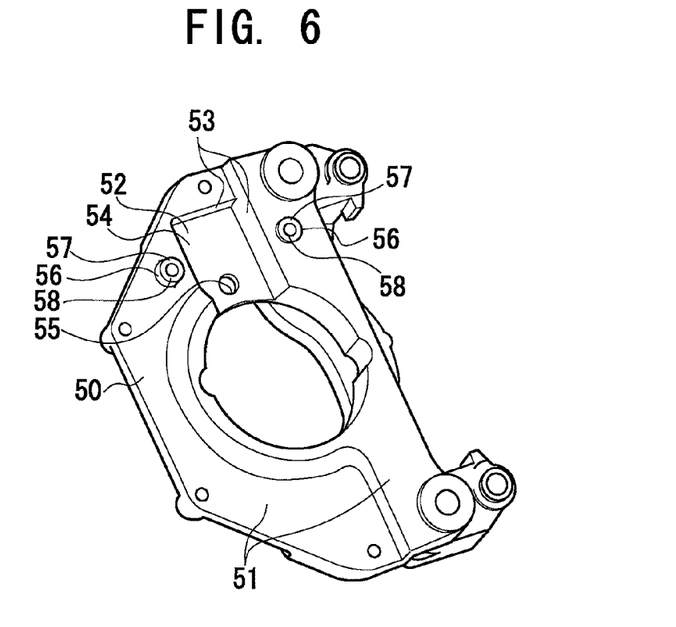
FIG. 6 is a perspective view of a brake flange according to the second embodiment.
Figure 7:
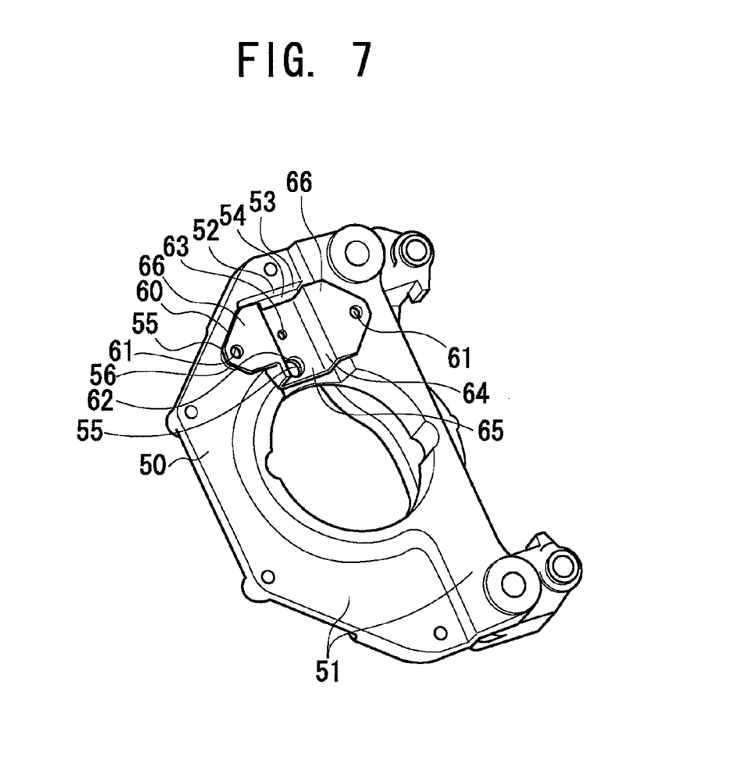
FIG. 7 is a perspective view of the brake flange with a bracket disposed thereon

Next, a second embodiment of the present invention will be described with reference to FIG.S. 5 to 7.

Figure 8:
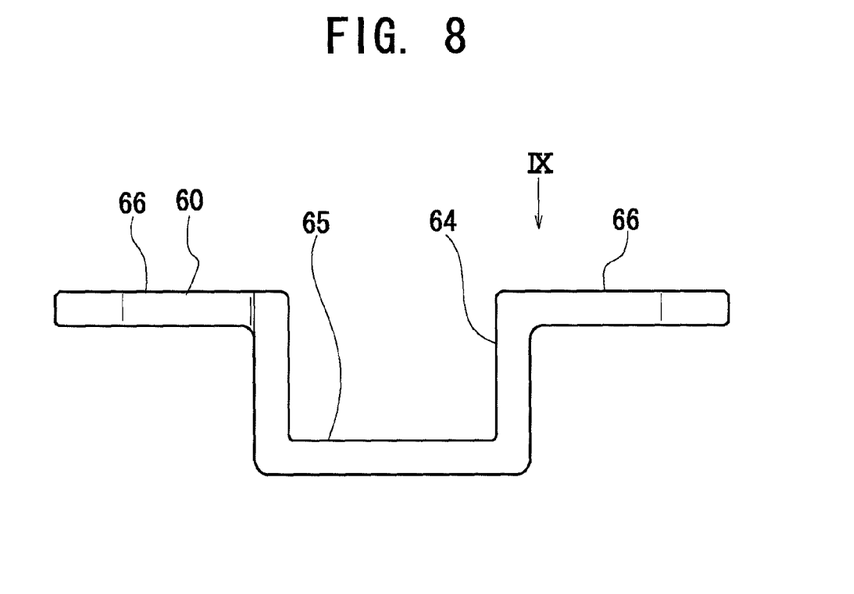
FIG. 8 is a side elevational view of the bracket according to the second embodiment.
Figure 9:
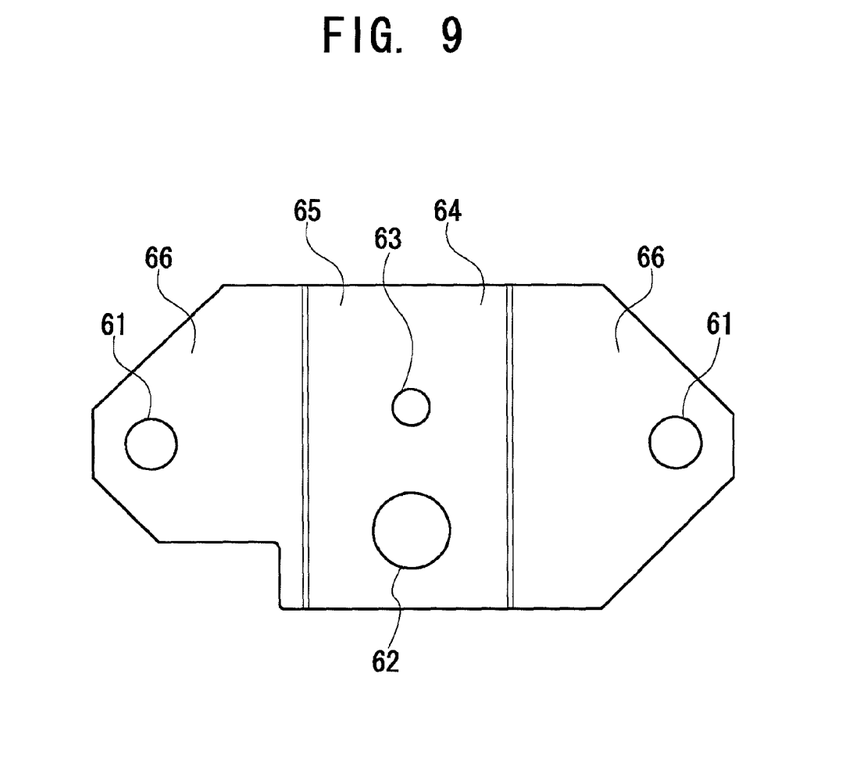
FIG. 9 is a plan view of FIG. 8 as viewed in the IX direction.

FIG. 5 is a perspective view of a mounting structure for wheel rotation sensor according to the second embodiment; FIG. 6 is a perspective view of a brake flange according to the second embodiment; FIG. 7 is a perspective view of the brake flange with a bracket disposed thereon; FIG. 8 is a side elevational view of the bracket according to the second embodiment; and FIG. 9 is a plan view of FIG. 8 as viewed in the IX direction. Note that, in the second embodiment, the aspects of the brake flange 20 and bracket 30 in the above-described first embodiment are modified while the conFIG.uration of the other components are the same as those in the first embodiment, and therefore the same reference numerals are added to these components and the descriptions thereof are omitted. Moreover, a disc pad and a dust cover are not illustrated in FIG. 5.

As illustrated in FIG. 5, a flange surface (second side surface) 51 of a brake flange 50 is caused to face inward in the vehicle width direction, that is, in a direction opposite to that in the above-described first embodiment. A bracket 60 with a wheel rotation sensor 40 fixed thereto is attached to the flange surface 51.

The brake flange 50 is disposed near a sensor rotor 10, and includes the flange surface (second side surface) 51 on a side opposite to a surface (first side surface) thereof facing the sensor rotor 10, the flange surface 51 having two stages of different heights, substantially orthogonally intersecting the axle. The brake flange 50 is welded to an axle case 1 with the flange surface 51 facing inward in the vehicle width direction. In the brake flange 50, a housing 52 and boss portions 56 are integrally formed on the flange surface 51 by casting. Fixed to the brake flange 50 are a disc pad 6 that brakes the brake rotor 5, the bracket 60 with the wheel rotation sensor 40 fixed thereto, and the like.

The housing 52 includes a wall portion 53, a bottom portion 54, and a hole portion (sensor insertion portion) 55 formed in a part of the bottom portion 54.

Two boss portions 56 are disposed sandwiching the housing 52, and protrude each in cylindrical form away from the sensor rotor 10 in the axle direction respectively from the two stages, having different heights, of the flange surface 51. The boss portions 56 respectively include: distal portions 57 having surfaces of the same height, substantially orthogonal to the axle; and nut portions 58 into each of which a bolt 59 is screwed in a direction substantially parallel to the axle from the distal portion 57 toward the surface, opposite to the flange surface 51, of the brake flange 50.

The bracket 60 is a press-formed metal plate, and includes: a concave portion 64 to be housed in the housing 52 of the brake flange 50; and pinnate portions 66 extending respectively from both ends of the concave portion 64. In a bottom surface portion 65 of the concave portion 64, a sensor insertion hole 62 and a fixing hole 63 are formed. In each of the pinnate portions 66, an insertion hole 61 arranged to face the nut portion 58 of the corresponding boss portion 56 is formed. The bracket 60 is fixed to the brake flange 50 while contacting the distal portions 57 of the boss portions 56 in a way that the bolts 59 inserted into the insertion holes 61 are screwed respectively into the nut portions 58.

In this embodiment, the wheel rotation sensor 40 is fixed in a manner that a mounting hole 45 (see FIG. 3) and the fixing hole 63 of the bracket 60 are fixed to each other with a bolt 46 and a nut 47, with a detecting portion 41 of a device portion 43 (see FIG. 3) being inserted into the sensor insertion hole 62 of the bracket 60 from the bottom surface portion 65 side. The wheel rotation sensor 40 fixed to the bracket 60 is fixed to the brake flange 50 in a manner that the nut portions 58 are positioned to face the insertion holes 61 of the bracket 60 and that the bolts 59 are screwed into the nut portions 58. Here, the detecting portion 41 is opposed to the detected portion 11 of the sensor rotor 10 through the hole portion 55 in the housing 52 of the flange surface 51 of the brake flange 50, and thus, to face the rotation trajectory of the sensor rotor 10 in the direction substantially parallel to the axle.

In this embodiment, the flange surface 51 is provided on the side, opposite to the surface facing the sensor rotor 10, of the brake flange 50. The brake flange 50 includes the hole portion 55 penetrating the brake flange 50 from the flange surface 51 to the surface facing the sensor rotor 10. The boss portions 56 protrude from the flange surface 51 in the direction away from the sensor rotor 10. This makes it possible to arrange the surface facing the sensor rotor 10 near the sensor rotor 10, and hence to achieve a compact whole structure. In addition, the sensor rotor 10 is not disposed on the flange surface 51 side where the wheel rotation sensor 40 is to be positioned and mounted. For this reason, since this positioning and mounting work can be performed in a free space, the work ability is improved. Moreover, since the area of each of the distal portions 57 of the boss portions 56 is reduced, workability in the cutting is improved.

Note that, in the present invention, the conFIG.uration of the sensor rotor 10 and the wheel rotation sensor 40 is not limited to those of the above-described first and second embodiments. For example, it is possible to employ, as the sensor rotor, one that includes an annular detected portion magnetized alternately with the south poles and the north poles, while employing, as the wheel rotation sensor, one that detects a magnetic field.

In addition, the boss portions 26, 56 of the brake flange 20, 50 may not be conFIG.ured so that, as in the above first and second embodiment, one nut portion 28, 58 is formed in each boss portion 26, 56 and all the nut portions 28, 58 are used for fixing the bracket 30, 60. In other words, the insertion holes of the bracket are not necessarily positioned to face all the nut portions of the boss portions on one-on-one basis. For example, the boss portion of the brake flange may be conFIG..ured so that a number of nut portions are formed in one or multiple boss portions protruding from the flange surface, and so that the nut portions to be used are selected depending on the sensor and the bracket to be used.

INDUSTRIAL APPLICABILITY

The wheel rotation sensor for a vehicle of the present invention is favorably used for various types of vehicles.

The invention claimed is:

1. A mounting structure for wheel rotation sensor comprising:
a brake flange being disposed near a sensor rotor fixed to an axle of a wheel, including a flange surface intersecting the axle, and being fixed to a vehicle body side;
a boss portion protruding integrally from the flange surface of the brake flange and including a distal surface intersecting the axle;
a bracket fixed to the brake flange while contacting the distal surface of the boss portion; and
a wheel rotation sensor fixed to the bracket, facing a rotation trajectory of the sensor rotor, and detecting the sensor rotor in a direction substantially parallel to the axle.

2. A mounting structure for wheel rotation sensor comprising:
a brake flange being disposed near a sensor rotor fixed to an axle of a wheel, including a flange surface intersecting the axle, and being fixed to a vehicle body side:
a boss portion protruding integrally from the flange surface of the brake flange;
a bracket fixed to the brake flange while contacting a distal portion of the boss portion; and
a wheel rotation sensor fixed to the bracket, facing a rotation trajectory of the sensor rotor, and detecting the sensor rotor in a direction substantially parallel to the axle, wherein
the brake flange includes:
a first side surface facing the sensor rotor;
a second side surface on a side opposite to the first side surface, the second side surface serving as the flange surface; and
a sensor insertion portion penetrating from the first side surface to the second side surface,
the boss portion protrudes from the second side surface in a direction away from the sensor rotor, and
the wheel rotation sensor is fixed to the brake flange with the bracket therebetween while being inserted into the sensor insertion portion.

* * * * *